US011555106B2

(12) United States Patent
Roskamp et al.

(10) Patent No.: US 11,555,106 B2
(45) Date of Patent: Jan. 17, 2023

(54) POLYMER COMPOSITION WITH IMPROVED MECHANICAL PROPERTIES

(71) Applicant: SIKA TECHNOLOGY AG, Baar (CH)

(72) Inventors: Robert Roskamp, Altdorf (CH); Dorothee Quinzler, Alpnach Dorf (CH); Peter Hübscher, Obernau (CH); Roy Z'Rotz, Ebikon (CH); Herbert Ackermann, Tann (CH); Frank Höfflin, Baden (CH)

(73) Assignee: SIKA TECHNOLOGY AG, Baar (CH)

( * ) Notice: Subject to any disclaimer, the term of this patent is extended or adjusted under 35 U.S.C. 154(b) by 488 days.

(21) Appl. No.: 16/631,033

(22) PCT Filed: Aug. 3, 2018

(86) PCT No.: PCT/EP2018/071111
§ 371 (c)(1),
(2) Date: Jan. 14, 2020

(87) PCT Pub. No.: WO2019/025584
PCT Pub. Date: Feb. 7, 2019

(65) Prior Publication Data
US 2020/0140669 A1 May 7, 2020

(30) Foreign Application Priority Data

Aug. 3, 2017 (EP) .................................... 17184798

(51) Int. Cl.
| | |
|---|---|
| *C08L 23/16* | (2006.01) |
| *B29C 48/07* | (2019.01) |
| *C08J 3/20* | (2006.01) |
| *C08J 3/24* | (2006.01) |
| *C08J 5/18* | (2006.01) |
| *E04D 5/06* | (2006.01) |
| *E04D 5/14* | (2006.01) |
| *B29K 23/00* | (2006.01) |
| *B29K 105/00* | (2006.01) |
| *B29L 31/10* | (2006.01) |

(52) U.S. Cl.
CPC .............. *C08L 23/16* (2013.01); *B29C 48/07* (2019.02); *C08J 3/201* (2013.01); *C08J 3/247* (2013.01); *C08J 5/18* (2013.01); *E04D 5/06* (2013.01); *E04D 5/149* (2013.01); *B29K 2023/08* (2013.01); *B29K 2023/14* (2013.01); *B29K 2105/0014* (2013.01); *B29K 2105/0044* (2013.01); *B29K 2105/0085* (2013.01); *B29L 2031/10* (2013.01); *C08J 2323/16* (2013.01); *C08J 2423/22* (2013.01); *C08J 2423/28* (2013.01); *C08L 2203/162* (2013.01); *C08L 2205/025* (2013.01); *C08L 2205/03* (2013.01); *C08L 2207/04* (2013.01); *C08L 2312/00* (2013.01)

(58) Field of Classification Search
CPC .............. C08L 23/16; C08L 2203/162; C08L 2205/03; C08L 2205/025; C08L 2312/00; C08L 2207/04; C08L 2423/28; B29K 2023/08; C08J 5/18; C08J 3/247; C08J 2323/16; C08J 3/201; E04D 5/06; E04D 5/149; B29C 48/07
USPC ......................................................... 156/71
See application file for complete search history.

(56) References Cited

U.S. PATENT DOCUMENTS

| | | | | |
|---|---|---|---|---|
| 7,138,448 | B2 * | 11/2006 | Kaprinidis | ......... C08K 5/34928 524/464 |
| 7,276,559 | B2 | 10/2007 | Abraham et al. | |
| 2006/0100347 | A1 | 5/2006 | Ouhadi et al. | |
| 2011/0241262 | A1 * | 10/2011 | Siddhamalli | ........ B29C 45/0001 525/227 |
| 2015/0083297 | A1 * | 3/2015 | Inata | ....................... C08L 23/28 428/480 |

FOREIGN PATENT DOCUMENTS

| | | | |
|---|---|---|---|
| JP | 55048232 A | * | 4/1980 |
| WO | 2011/090759 A2 | | 7/2011 |
| WO | 2016/064479 A1 | | 4/2016 |

OTHER PUBLICATIONS

Sep. 19, 2018 International Search Report issued in International Patent Application No. PCT/EP2018/071111.
Sep. 19, 2018 Written Opinion of the International Searching Authority issued in International Patent Application No. PCT/EP2018/071111.
May 20, 2020 Office Action issued in European Patent Application No. 17184798.1.

* cited by examiner

*Primary Examiner* — Hui H Chin
(74) *Attorney, Agent, or Firm* — Oliff PLC

(57) ABSTRACT

A composition including a melt blend of at least one thermoplastic elastomer (TPE) and at least one non-crosslinked elastomer and optionally at least one catalyst for catalyzing chain extension and/or crosslinking and/or coupling reactions of the at least one non-crosslinked elastomer. Further, a method for producing a polymer composition, to a shaped article including a substrate layer composed of the composition, to a method producing a shaped article, and to a method for covering a roof using the shaped articles.

20 Claims, No Drawings

POLYMER COMPOSITION WITH IMPROVED MECHANICAL PROPERTIES

TECHNICAL FIELD

The invention relates to polymer compositions and use thereof for producing industrial liners such as waterproofing membranes.

BACKGROUND OF THE INVENTION

Waterproofing membranes are used in the construction industry to seal bases, underground surfaces or roofing structures against water penetration.

State-of-the art waterproofing membranes are typically multilayer systems comprising a polymer-based barrier layer to provide watertightness. Typical polymers used in the barrier layer include thermoplastics such as plasticized polyvinylchloride (p-PVC), thermoplastic elastomers (TPE), and elastomers such as ethylene-propylene diene monomer (EPDM). Thermoplastic elastomer is a group of materials, which have both thermoplastic and elastic properties. A typical thermoplastic elastomer (TPE) is a blend of a thermoplastic polymer and an elastomer component. The components of the TPE can be formed as a reactor blend, in which case the thermoplastic polymer and the elastomer are simultaneously produced in a single reactor vessel using different catalysts, or as a physical blend, wherein the components are separately produced and melt-blended using high-shear mixing technique. TPE's can also be provided as single polymer component materials composed of semi-crystalline block copolymers containing phase separated hard (crystalline) and soft (amorphous) segments.

Thermoplastic olefins (TPO), also known as olefinic thermoplastic elastomers (TPE-O), are thermoplastic elastomers based solely on olefinic components. Typical TPOs contain a plastic olefin, such as polypropylene or polyethylene, as the thermoplastic component and an olefin copolymer elastomer (OCE), such as ethylene propylene rubber (EPR) or EPDM, as the elastomer component. TPO compositions based on a physical blend or reactor blend of a propylene homopolymer or random copolymer having at least 95 wt.-% propylene content with an alpha-olefin comonomer, and an EPR or EPDM comprised in the blend in an amount of less than 20 wt.-%, can also be characterized as impact-modified polypropylenes. TPOs based on copolymers of ethylene or propylene with another alpha-olefin, such as butene or octene as comonomer, are also known as polyolefin elastomers (POE).

Especially in roofing applications, the waterproofing membrane should be able to conform with various application specific requirements. First of all, the membrane should have high enough mechanical strength in order to resist the shearing forces applied on it, for example caused by wind loads. In addition, the membrane should have high flexibility to enable easy installation on surface of roofing substrates, especially in corner and edge areas. Finally, the material of the membrane should be weldable in order to enable adhering of adjacent membranes by heat-welding. Waterproofing membranes based on crosslinked EPDM are very flexible and resistant to weathering but they are not heat-weldable due to the chemically crosslinked structure. Consequently, seams between EPDM membranes have to be sealed using welding tapes produced from different materials than the membrane such as uncrosslinked EPDM or bonded with special adhesives developed for the crosslinked EPDM materials. Membranes composed of thermoplastic olefins (TPO) are heat-weldable and less expensive than EPDM-membranes but they are also more rigid which decreases their suitability for roofing applications. Membranes based on plasticized PVC are more flexible than TPO-based membranes but they also contain environmentally harmful plasticizers and heavy metal additives such as flame retardants that may restrict their use in some applications.

In order to obtain a flexible heat-weldable waterproofing membrane, multilayer membrane systems have been suggested, such as combining an EPDM-based core layer with top and bottom layers based on TPO-materials to obtain a heat-weldable EPDM-membrane. Another approach has been to increase the proportion of the elastomer component in a TPO-material to obtain a membrane with reduced flexural modulus. However, increasing the proportion of the elastomer component, such as EPM or EPDM over 20 wt.-%, tends to render such blends tacky, which usually prevents processing such compositions by conventional processing techniques such as injection molding.

The increased tackiness also contributes to a phenomenon known as blocking, which is referred as adhesion force between adjacent layers, which have been pressed together. In case of TPE layers, the adhesion force between two layers typically results from van der Waals forces between amorphous regions of the polymeric materials. The blocking complicates various post-processing steps such as cutting, welding, stacking, and unwinding from a roll. Organic and inorganic antiblocking agents are typically used to decrease the blocking of thin polyolefin films. The tackiness can also be reduced by crosslinking at least part of the elastomer component of the TPE-material. Such modified TPEs can be obtained by melt-blending a statically or dynamically crosslinked elastomer component with a plastic component. TPEs containing a dynamically vulcanized (crosslinked) elastomer component are also known as thermoplastic vulcanizates (TPV, TPE-v).

"Dynamic vulcanization" refers to a process in which a rubber component is selectively vulcanized during mixing of a blend comprising a technologically compatible rubber and plastic component while minimally affecting the plastic component. Vulcanization of the rubber component is not initiated before a well-mixed polymer blend is formed and the intensive mixing is continued during the vulcanization step. State-of-the-Art commercially available TPVs typically consist of a plastic matrix that is filled with micrometer size fully crosslinked rubber particles. TPV's are said to combine the elastomeric properties obtained with the dispersed crosslinked rubber phase with the fabricability of thermoplastics materials.

The State of the Art TPV's are mostly used for producing shaped articles by means of molding methods, such as by injection molding, extrusion molding, calender molding, and blow molding. These types of shaped articles are used, for example, in automotive industry as interior materials. In production of articles by molding methods, the melt processability of the material related to low melt viscosity and high fluidity is of high importance. Good melt processability is typically obtained with a phase morphology, in which the crosslinked rubber phase exists as dispersed particles in a continuous plastic matrix. The melt processability can also be improved by adding processing oils to the TPV compositions. Examples of TPVs developed for use in molding processes are disclosed, for example, in U.S. Pat. No. 7,276,559 B2 and US 2006/0100347 A1. The State-of-the Art TPVs, however, can only be produced with relatively high costs. The production process requires the use of extruders with high torque motors since the viscosity of the mixed blend is rapidly increased as the crosslinking degree of the rubber phase increases. Significant amount of mechanical energy has to be introduced to the blend in order obtain a homogeneously mixed blend, in which the cross-linked rubber particles are dispersed throughout the plastic matrix. Furthermore, the State-of-the-Art TPVs are less flexible than for example plasticized PVC and, therefore, these materials are not very suitable for use in roofing membranes.

There is thus a need for a new polymer material for use in waterproofing and roofing membranes, which is at least as flexible as plasticized PVC, has the heat-weldability of TPO-materials, low-blocking behavior, and which furthermore can be produced with lower costs than State-of-the-Art TPV-materials.

SUMMARY OF THE INVENTION

The object of the present invention is to provide a polymer composition, which has low elastic modulus, high resistance to impact, low blocking force, and good weldability.

Another objective of the present invention is to provide a polymer composition, which can be produced with lower costs than State-of-the Art thermoplastic vulcanizates (TPV).

It was surprisingly found that a polymer composition solving the problems related to State-of-the-Art polymer compositions, which are used as materials for waterproofing and roofing membranes, can be obtained as a melt blend of at least one thermoplastic polymer and at least one non-crosslinked elastomer and optionally at least one catalyst.

The subject of the present invention is a composition as defined in claim 1.

One of the advantages of the composition of the present invention is that it is more flexible than typical TPO- and dynamically crosslinked TPV-materials and as flexible as the typical PVC-materials comprising 20-50 wt.-% of plasticizers.

Despite the relatively high amount of the elastomer component, which is required to obtain high flexibility, the composition of the present invention shows only minor blocking behavior. Depending on the embodiment of the composition, the blocking can also be completely eliminated.

Furthermore, the composition of the present invention shows excellent mechanical properties, in particular high resistance to impact and shear strength, which are comparable to or higher than those of State-of-the-Art TPO-materials. Finally, the shaped articles composed of the composition of the present invention can be joined to each other and to other thermoplastic articles such as roofing membranes by heat-welding.

Other aspects of the present invention are presented in other independent claims. Preferred aspects of the invention are presented in the dependent claims.

DETAILED DESCRIPTION OF THE INVENTION

The subject of the present invention is a composition comprising a melt blend of:
a) 15-95 wt.-% of at least one thermoplastic elastomer,
b) 5-50 wt.-% of at least one non-crosslinked elastomer, said proportions being based on the total weight of the blend, wherein the melt blend is obtained by melt processing of the blend components.

Substance names beginning with "poly" designate in the present document substances which formally contain, per molecule, two or more of the functional groups occurring in their names. For instance, a polyol refers to a compound having at least two hydroxyl groups. A polyether refers to a compound having at least two ether groups.

The term thermoplastic elastomer (TPE) refers to a polymeric material that has elastomer like properties and thermoplastic processability.

The term "thermoplastic olefin (TPO)" refers to a thermoplastic elastomer (TPE) composed solely of olefin monomeric units. Also used herein, the term "thermoplastic olefin" may be used interchangeably with the terms "thermoplastic polyolefin", and "olefinic thermoplastic elastomer" (TPE-O).

The term "elastomer" refers to any polymer or combination of polymers, which is capable of recovering from large deformations, and which can be, or already is, modified to a state in which it is essentially insoluble (but can swell) in a boiling solvent. As used herein, the term "elastomer" may be used interchangeably with the term "rubber."

The term "molecular weight" refers to the molar mass (g/mol) of a molecule or a part of a molecule, also referred to as "moiety". The term "average molecular weight" refers to number average molecular weight ($M_n$) of an oligomeric or polymeric mixture of molecules or moieties. The molecular weight may be determined by gel permeation chromatography (GPC) with a polystyrene standard.

The term "glass transition temperature" refers to the temperature measured by differential scanning calorimetry (DSC) method according to ISO 11357 standard above which temperature a polymer component becomes soft and pliable, and below which it becomes hard and glassy. The measurements can be performed with a Mettler Toledo 822e device using a heating rate of 2 degrees centigrade/min. The $T_g$ values can be determined from the measured DSC-curve with the help of the DSC software.

The term "crosslinked" designates a polymer matrix, in which the polymer chains are inter-connected by a plurality of covalent bonds that are stable mechanically and thermally. Other possible forms of crosslinked polymers such as physically crosslinked polymers are not regarded as "crosslinked" in the context of the present disclosure. The terms "cured" and "vulcanized" may be used interchangeably with the term "crosslinked".

The term "crosslinking degree" refers to a proportion of the component, which is insoluble in boiling xylene. The percentage of insoluble proportion can be determined by refluxing a test specimen in boiling xylene, weighting the dried residue and making suitable corrections for other soluble and insoluble components present in the tested composition. Preferably, the crosslinking degree is measured by using a method as defined ISO 10147 standard.

The term "continuous" when used to describe process or process step refers to any process in which reagents and reacted products are supplied and removed continuously while a steady state or a stable reaction conditions are achieved.

The "amount or content of at least one component X" in a composition, for example "the amount of the at least one thermoplastic polymer" refers to the sum of the individual amounts of all thermoplastic polymers contained in the composition. For example, in case the composition comprises 20 wt.-% of at least one thermoplastic polymer, the sum of the amounts of all thermoplastic polymers contained in the composition equals 20 wt.-%.

The melt blend is obtained by melt processing of the blend components. The term "melt processing" refers in the present document to a process, in which at least one molten polymeric component is intimately mixed with at least one other component, which may be another molten polymeric component or a solid component, such as catalyst. The term "melt processing" can be used interchangeably with the terms "melt-mixing" and "melt-blending".

The term "blend components" refers to the constituents a) and b) and optionally other constituents of the blend, which are melt processed to obtain the melt-blend. Due to the reactions, which may occur during the melt processing, such as chain extension and/or crosslinking and/or coupling reactions, the constituents of the blend and melt-blend may differ from each other.

According to one or more embodiments, the blend further comprises:
c) 0.1-5.0 wt.-% of at least one catalyst, based on the total weight of the blend.

The melt processing is preferably conducted at a temperature, which is above the melting point of the thermoplastic elastomer, or in case the blend comprises more than one thermoplastic elastomer, at a temperature, which is above the melting point of the thermoplastic elastomer having the highest melting point. The melt processing can be conducted as a batch process using any conventional mixer, such as a Brabender, Banbury, or roll mixer or as continuous process using a continuous type mixer, preferably an extrusion apparatus comprising an extruder, preferably a single screw or a twin screw extruder, and a die.

The maximum temperature of the blend during melt processing is preferably, not less than 150° C., more preferably not less than 160° C., most preferably not less than 180° C. The maximum temperature of the blend during melt processing can be in the range of 150-250° C., in particular 160-220° C., such as 180-200° C.

In case the melt processing is conducted as a batch process, the constituents of the blend, i.e. the at least one thermoplastic elastomer, the at least one non-crosslinked elastomer, and the optional components, are introduced into a batch mixing apparatus and melt processed to obtain a uniform blend. In embodiments wherein the blend comprises at least one catalyst, the temperature of the blend is increased during mixing until the chain extension and/or crosslinking/and/or coupling reactions of the at least one non-crosslinked elastomer are initiated. This is typically marked by an increase in the torque value of the motor of the mixing apparatus. In the case of continuous production process, the blend components, i.e. the at least one thermoplastic elastomer, the at least one non-crosslinked elastomer, and the optional components, are melt processed in a continuous type melt mixer, preferably a single screw extruder or twin screw extruder and the obtained melt-blend is subsequently extruded through an extruder die.

The preferred amount the at least one thermoplastic elastomer depends on the intended application of the composition. In case the composition is used for preparing a roofing membrane, the amount of the at least one thermoplastic elastomer is potentially lower due to the high amount of additives such as flame retardants. Preferably, the at least one thermoplastic elastomer is present in the blend in a total amount of at least 15 wt.-%, more preferably at least 20 wt.-%, even more preferably at least 30 wt.-%, most preferably at least 35 wt.-%, based on the total weight of the blend. In particular, the at least one thermoplastic elastomer may present in the blend in a total amount of 15-95 wt.-%, preferably 20-95 wt.-%, more preferably 25-90 wt.-%, even more preferably 30-90 wt.-%, most preferably 35-85 wt.-%, based on the total weight of the blend. It may also be preferred that the at least one thermoplastic elastomer is present in the blend in a total amount of 15-70 wt.-%, preferably 20-65 wt.-%, more preferably 25-60 wt.-%, even more preferably 30-55 wt.-%, most preferably 35-55 wt.-%, based on the total weight of the blend. On the other hand, it may be preferable that the at least one thermoplastic elastomer is present in the blend in a total amount of 40-95 phr (parts by weight per 100 parts by weight of the at least one non-crosslinked elastomer), more preferably 50-90 phr, even more preferably 55-85 phr, most preferably 60-85 phr.

The amount of the at least one non-crosslinked elastomer contained in the blend is not particularly restricted. Increasing the proportion of the non-crosslinked elastomer in the blend improves the flexibility of the resulting composition. However, it has also been found that blends containing over 50 wt.-% of non-crosslinked elastomers are difficult to melt-process due to the increased viscosity of the blend. Furthermore, it has been found out that compositions containing high amounts of elastomers tend to exhibit increased blocking due to the large portion of amorphous polymers. However, a certain amount of non-crosslinked elastomers is required to increase the flexibility of the composition beyond that of State-of-the-Art TPV-materials.

Preferably, the at least one non-crosslinked elastomer is present in the blend in a total amount of at least 5 wt.-%, more preferably at least 7.5 wt.-%, even more preferably at least 10 wt.-%, based on the total weight of the blend. In particular, it may be preferred that the at least one non-crosslinked elastomer is present in the blend in a total amount of 5-50 wt.-%, more preferably 10-45 wt.-%, even more preferably 12.5-40 wt.-%, in particular 15-35 wt.-%, most preferably 15-30 wt.-%, based on the total weight of the blend.

The at least one catalyst may be added to the blend to catalyze chain extension and/or crosslinking and/or coupling reactions of the polymer components during and/or after the melt processing of the blend components. The amount of the at least catalyst is adjusted to prevent significant crosslinking of the at least one non-crosslinked elastomer during the melt processing. By "significant crosslinking" is meant crosslinking of the at least one non-crosslinked elastomer to a crosslinking degree, measured by using the method as defined in ISO 10147 standard, of at least 10 wt.-%, such as at least 15 wt.-%, in particular at least 20%.

Significant crosslinking of the at least one non-crosslinked elastomer during the melt processing is not preferred since this has been found to result in increased energy consumption of the melt processing process without significant positive impact on the blocking behavior of the obtained composition. The increased energy consumption is a consequence of the higher viscosity of the crosslinked elastomer. Crosslinking of the at least one non-crosslinked elastomer to a significant crosslinking degree during the melt blending would also result in a dynamically crosslinked thermoplastic vulcanizate (TPE-V), in which the crosslinked elastomer is present in a continuous thermoplastic matrix as dispersed particles.

Preferably, the at least one elastomer is crosslinked during the melt processing to a crosslinking degree, measured by using the method as defined in ISO 10147 standard, of not more than 10.0 wt.-%, more preferably not more than 5.0 wt.-%, even more preferably not more than 2.5 wt.-%, most preferably not more than 1.5 wt.-%. It may be preferable that the composition comprises 5-50 wt.-%, more preferably 10-45 wt.-%, even more preferably 12.5-40 wt.-%, in particular 15-35 wt.-%, most preferably 15-30 wt.-%, based on the total weight of the blend, of at least one elastomer having a crosslinking degree of not more than 5 wt.-%, more preferably not more than 2.5 wt.-%, even more preferably not more than 2.0 wt.-%, most preferably not more than 1.5 wt.-%. It may also be preferable that the at least one elastomer is not crosslinked during the melt processing.

Preferably, the at least one catalyst is present in the blend in a total amount of not more than 5 wt.-%, more preferably not more than 4 wt.-%, most preferably not more than 2.5 wt.-%, based on the total weight of the blend. It may be preferable that the at least one catalyst is present in the blend in a total amount of 0.1-5.0 wt.-%, more preferably 0.1-2.5 wt.-%, even more preferably 0.1-2.0 wt.-%, most preferably 0.5-1.5 wt.-%, based on the total weight of the blend.

Suitable catalysts to be used in the blend include metal oxides, metal salts of fatty acids, and metal salts of boric acid, sulfur, phenol resin catalysts, fatty acids, and mixtures thereof.

Suitable metal oxide catalysts and metal salts of fatty acids include, for example, ZnO, CaO, MgO, $Al_2O_3$, $CrO_3$, FeO, $Fe_2O_3$, and NiO and zinc salts of fatty acids having at least 6 carbon atoms.

Suitable sulfur catalysts include, for example, powdered sulfur, precipitated sulfur, high dispersion sulfur, surface-treated sulfur, insoluble sulfur, dimorpholinedisulfide, alkylphenoldisulfide, and mixtures thereof. Such catalysts may be present in the blend in a total amount of 0.5-5.0 phr (parts by weight per 100 parts by weight of the at least one non-crosslinked elastomer).

Suitable phenol resin catalysts include, for example, bromides of an alkylphenol resin or mixed catalysts containing stannous chloride, chloroprene, or another halogen donor and an alkylphenol resin, and mixtures thereof. Such catalysts may be present in the blend in a total amount of 0.5-20.0 phr.

The at least one catalyst may also be used in combination with at least one accelerator selected from the group consisting of guanidine compounds, aldehyde amine compounds, aldehyde ammonium compounds, thiazole compounds, sulfonamide compounds, thiourea compounds, thiuram compounds, xanthane compounds, and dithiocarbamate compounds. Such accelerators may be present in the blend in a total amount of 0.1-5.0 phr.

The at least one catalyst is preferably selected from the group consisting of ZnO, CaO, MgO, $Al_2O_3$, $CrO_3$, FeO, $Fe_2O_3$, NiO, zinc salts of fatty acids having at least 6 carbon atoms, preferably at least 13 carbon atoms, zinc borate, and mixtures thereof.

The metal oxide based catalysts as well as the zinc salts of fatty acids having at least 6 carbon atoms, preferably at least 13 carbon atoms, and zinc borate have been turned out to be useful in producing shaped articles composed of the composition, such as roofing membranes, having a desired white color. Roofing membranes having white color absorb only a small amount of solar energy and consequently convert a minimal amount of the impinging electromagnetic energy spectrum of the sun light into heat and are, therefore, less susceptible to thermal degradation in hot climate outdoor applications. On the contrary, dark colored membranes absorb most of the sun light energy that impinges upon it, causing the surface to heat up quickly.

According to one or more embodiments, the at least one catalyst is ZnO, zinc salt of a fatty acid having at least 6 carbon atoms, preferably at least 13 carbon atoms, or zinc borate, or a mixture of ZnO and another metal oxide selected from the group consisting of CaO, MgO, $Al_2O_3$, $CrO_3$, FeO, $Fe_2O_3$, and NiO. Preferably the at least one catalyst is selected from the group consisting of ZnO, zinc salt of a fatty acid having at least 6 carbon atoms, more preferably at least 13 carbon atoms, even more preferably zinc stearate, or zinc borate.

The blend may further comprise one or more metal salts of a fatty acid different from the at least one catalyst and/or one or more fatty acids. Preferably, the metal in the metal salt of a fatty acid different from the at least one catalyst is selected from the group consisting of Zn, Ca, Mg, Al, Cr, Fe, Fe, and Ni. Preferably, the fatty acid has at least 6 carbon atoms, more preferably at least 13 carbon atoms. Saturated fatty acids having at least 6 carbon atoms, in particular at least 13 carbon atoms have been found particularly suitable.

According to one or more embodiments, the at least one catalyst is ZnO and the blend further comprises at least 0.05 wt.-%, preferably 0.1-0.5 wt.-%, based on the total weight of the blend, of at least one zinc salt of a fatty acid, preferably zinc stearate and/or at least 0.05 wt.-%, preferably 0.1-0.5 wt.-%, based on the total weight of the blend, at least one saturated fatty acid having at least 6 carbon atoms, preferably at least 13 carbon atoms.

According to one or more embodiments, the at least one catalyst is ZnO and the blend further comprises at least 0.05 wt.-%, preferably 0.1-0.5 wt.-%, based on the total weight of the blend, of zinc stearate and/or at least 0.05 wt.-%, preferably 0.1-0.5 wt.-%, based on the total weight of the blend, of a fatty acid selected from the group consisting of stearic acid and montanic acid.

It is also possible that some portion of the at least one catalyst present in the blend is not consumed in the chain extension and/or crosslinking/and/or coupling reactions of the at least one non-crosslinked elastomer during the melt-processing and extrusion steps. It may, therefore, be preferred that the at least catalyst is also present in the composition. The amount of the at least one catalyst in the composition is preferably significantly lower than in the blend. It may be preferable that the composition comprises not more than 1.0 wt.-%, more preferably not more than 0.5 wt.-%, most preferably not more than 0.25 wt.-%, based on the total weight of the composition, of the at least one catalyst.

The at least one non-crosslinked elastomer may be selected from the group consisting of butyl rubber, halogenated butyl rubber, ethylene-propylene diene rubber (EPDM), natural rubber, chloroprene rubber, synthetic 1,4-cis-polyisoprene, polybutadiene, ethylene-propylene rubber, styrene-butadiene copolymer, isoprene-butadiene copolymer, styrene-isoprene-butadiene rubber, methyl methacrylate-butadiene copolymer, methyl methacrylate-isoprene copolymer, acrylonitrile-isoprene copolymer, and acrylonitrile-butadiene copolymer.

Preferred non-crosslinked elastomers include isobutylene-based homopolymers and copolymers. These polymers can be described as random copolymer of a $C_4$ to $C_7$ isomonoolefin derived unit, such as isobutylene derived unit, and at least one other polymerizable unit.

In case the composition of the present invention is used for producing a waterproofing membrane, in particular a waterproofing membrane used in roofing applications, the at least one non-crosslinked elastomer should have a relatively low degree of unsaturation. The term "degree of unsaturation" refers in the present document to the ratio of the number of unsaturated carbon-to-carbon bonds to the number of atoms in the linear chain of the average theoretical linear elastomer molecule. The low degree of unsaturation is essential in roofing applications, in which the polymeric membranes have to be able to withstand permanent exposure to various environmental factors, in particular UV-radiation. On the other hand, some degree of unsaturation may also be preferred to enable the chain extension and/or crosslinking/ and/or coupling reactions to occur during the melt processing. Preferably, the at least one non-crosslinked elastomer, before melt processing, has a mole percent unsaturation of not more than 5.0, preferably not more than 2.5.

The viscosity of the at least one non-crosslinked elastomer, before melt processing, has been found to have a significant impact to the extrusion head pressure. Preferably, the at least one non-crosslinked elastomer has, before melt processing, a Mooney Viscosity (ML 1+8 at 125° C.) of not more than 100, more preferably not more than 75, most preferably not more than 50. It may be advantageous that the at least one non-crosslinked elastomer has, before melt processing, a Mooney Viscosity (ML 1+8 at 125° C.) in the range of 10-75, more preferably 20-50.

The at least one non-crosslinked elastomer is preferably selected from the group consisting of butyl rubber and halogenated butyl rubber, preferably halogenated butyl rubber. The term "halogenated rubber" refers in the present documents to a rubber having a halogen content of at least 0.1 mol.-percent, wherein the halogen is preferably selected from the group consisting of bromine, chlorine and iodine. Preferred halogenated butyl rubbers have a halogen content in the range of 0.1-10 wt.-%, more preferably 0.5-8 wt.-%, most preferably 0.5-5.0 wt.-%, based on the total weight of the butyl rubber.

According to one or more embodiment, the at least one non-crosslinked elastomer is a halogenated butyl rubber, preferably a bromobutyl rubber or a chlorobutyl rubber, preferably having a halogen content in the range of 0.1-10 wt.-%, more preferably 0.5-8 wt.-%, most preferably 0.5-5.0 wt.-%, based on the total weight of the halogenated rubber.

According to one or more embodiments, the at least one non-crosslinked elastomer is a bromobutyl rubber, the at least catalyst is ZnO, and the blend further comprises at least 0.05 wt.-%, preferably 0.1-0.5 wt.-%, based on the total weight of the blend, of at least one zinc salt of a fatty acid, preferably zinc stearate, and/or at least 0.05 wt.-%, preferably 0.1-0.5 wt.-%, based on the total weight of the blend, of at least one saturated fatty acid having at least 6 carbon atoms, preferably at least 13 carbon atoms. The at least one saturated fatty acid may be selected from the group consisting of stearic acid and montanic acid.

According to one or more embodiments, the at least one non-crosslinked elastomer is a bromobutyl rubber, the at least catalyst is selected from the group consisting of zinc salts of a fatty acid, preferably zinc stearate, and zinc borate, and the at least one catalyst is present in the blend in a total amount of 0.1-5.0% wt.-%, more preferably 0.1-2.5 wt.-%, even more preferably 0.1-2.0 wt.-%, most preferably 0.5-1.5 wt.-%, based on the total weight of the blend.

According to one or more embodiments, the thermoplastic elastomer and the elastomer are present in the composition, i.e. after the melt processing, as a co-continuous phase. The term "co-continuous phase" refers in the present document to a morphology in which a continuous boundary line is formed between the two phases instead of island-like dispersion of the first phase in second continuous phase or island-like dispersion of the second phase in the continuous first phase. The term "continuous phase" refers in the present document to a phase, which contains at least one connected path of material points lying entirely within that phase and that spans macroscopically ("percolates") across the material sample.

Preferably, the at least one thermoplastic elastomer and the at least one non-crosslinked elastomer are compatible. By the polymers components being "compatible" is meant in the present disclosure that the properties of a blend composed of the at least one thermoplastic elastomer and the at least one non-crosslinked elastomer are not inferior to those of the individual polymer components. It may also be preferable that the at least one thermoplastic elastomer and the at least one non-crosslinked elastomer are partially miscible but not necessarily entirely miscible with each other. By the polymer components being "miscible" is meant in the present disclosure that a polymer blend composed of the at least one thermoplastic elastomer and the at least one non-crosslinked elastomer has a negative Gibbs free energy and heat of mixing. The polymer blends composed of entirely miscible polymer components tend to have one single glass transition point, which can be measured using dynamic mechanical thermal analysis (DMTA). The glass transition point can be determined, for example, as the peak of the measured tan delta curve (ratio of storage and loss moduli).

According to one or more embodiments, the at least one thermoplastic elastomer is a thermoplastic olefin (TPE-O). Thermoplastic olefins based on polymer blends as well as block copolymer-type thermoplastic olefins, such as polyolefin elastomers (POE), are suitable for use as the at least one thermoplastic elastomer in the composition of the present invention.

Suitable polyolefin elastomers (POE) include propylene based elastomers, such as metallocene polymerized semicrystalline propylene-ethylene copolymer elastomers having an overall ethylene content in the range of 10-20 wt.-%. These are commercially available, for example, under the trade name of Vistamaxx® (from Exxon Mobil), such as Vistamaxx® 6102 and Vistamaxx® 6202. Further suitable propylene based elastomers include propylene-ethylene copolymer elastomers having a propylene monomer content of greater than 70 wt.-%, such as greater than 80 wt.-% and ethylene monomer content of greater than 5 wt.-%. These are commercially available, for example, under the trade name of Versify® (from Dow Chemical Company), such as Versify® 4301 and Versify® 4200.

Metallocene polymerized copolymers of ethylene and alpha olefin, such as copolymers of ethylene with $C_4$-$C_8$ alpha-olefin comonomer, having an overall ethylene content in the range of 85-98 wt.-%, are also suitable. These copolymer compositions are sometimes characterized as "plastomers" and they are commercially available, for example, under the trade name of Exact® (from Exxon Mobil) and Engage® (from Dow Chemicals).

Suitable thermoplastic olefins also include polypropylene impact copolymers and heterophasic polypropylene copolymers. These types of thermoplastic olefins generally comprise a propylene polymer and an elastomer, typically an olefin copolymer elastomer (OCE). The propylene polymer may be a propylene homopolymer or a random copolymer of propylene having a propylene content, for example, of at least 95 wt.-%. Suitable random copolymers include copolymers of propylene with ethylene or with $C_4$-$C_6$ alpha-olefin comonomer, typically ethylene. Suitable olefin copolymer elastomers (OCE) include ethylene-propylene rubber/ elastomer having an ethylene content, for example, of 20-70 wt.-%.

The heterophasic polypropylene copolymers can be prepared as a reactor blend wherein the propylene homo polymer or the random propylene copolymer and the olefin copolymer elastomer (OCE) constituents are simultaneously formed by polymerization of propylene with another appropriate olefin comonomer. Alternatively, these may be formed by melt processing of a propylene polymer with an olefin copolymer elastomer, each of which was separately formed prior to blending of the constituents. Heterophasic polypropylene copolymers prepared as a reactor blend are sometimes characterized as "reactor TPOs". The amount of the elastomer component in polypropylene impact copolymers is usually significantly lower than in reactor TPOs.

Suitable reactor TPOs and heterophasic polypropylene copolymers are commercially available, for example, under the trade name of Hifax® (from LyondellBasell), such as Hifax® CA 10A and Hifax® CA12A, and under the trade name of Borsoft®, such as Borsoft® SD233CF.

According to one or more embodiments, the at least one thermoplastic elastomer is selected from the group consisting of hetero-phasic polypropylene copolymers and metallocene polymerized semicrystalline propylene-ethylene copolymer elastomers, and mixtures thereof.

It may be preferable that the blend comprises at least one hetero-phasic polypropylene copolymer and at least one metallocene polymerized semicrystalline propylene-ethylene copolymer elastomer. The weight ratio of the amount of the at least one hetero-phasic polypropylene copolymer to the amount of the at least one metallocene polymerized semicrystalline propylene-ethylene copolymer elastomer may be in the range of 0.1-1.5, preferably 0.2-1.25, most preferably 0.3-0.75. The at least one hetero-phasic polypropylene copolymer may be selected from the group consisting of hetero-phasic polypropylene copolymers comprising isotactic polypropylene as matrix phase and ethylene propylene-rubber as dispersed phase and hetero-phasic polypropylene copolymers comprising polypropylene-ethylene random copolymer as matrix phase and ethylene propylene-rubber as dispersed phase.

The blend may further comprise at least one hindered amine light stabilizer (HALS). These compounds are typically added to polymer blends as stabilizers against light-induced polymer degradation. Such stabilizers are needed, in particular, in case the composition is used in roofing applications, for example, for providing a roofing membrane containing one or more layers composed of the composition of the present invention.

HALS-types having strong basicity are preferably not added to the blend, especially in case the at least one catalyst consists or comprises one or more metal oxides, zinc salts of fatty acids, zinc borate, or mixtures thereof. Especially in case the at least one catalyst comprises or consists of at least one metal oxide, zinc salts of fatty acids, zinc borate, or mixtures thereof, in particular ZnO, the at least one hindered amine light stabilizer is preferably an alkoxyamine hindered amine light stabilizer (NOR-HALS). These HALS-types have typically a very low basicity and a $pk_a$ value of around 4-5.

According to one or more embodiments, the blend further comprises 0.1-10.0 by weight, preferably 0.1-5.0% by weight, based on the total weight of blend, of at least one alkoxyamine hindered amine light stabilizer (NOR-HALS). Suitable commercially available alkoxyamine hindered amine light stabilizers (NOR-HALS) include:
bis-(1-octyloxy-2,2,6,6-tetramethyl-4-piperidinyl) sebacate, commercially available, for example, as Tinuvin® NOR 123 (from Ciba Chemicals, CAS number 129757-67-1); derivatives of N-butyl-2,2,6,6-tetramethyl-4-piperidinamine, commercially available, for example, as Tinuvin® NOR 152 (from Ciba Chemicals); reaction products with 3-bromo-1-propene, n-butyl-1-butanamine and N-butyl-2,2,6,6-tetramethyl-4-piperidinamine, oxidised, hydrogenated, commercially available, for example, as Tinuvin NOR® 371 (from Ciba Chemicals); reaction products of N,N'-ethane-1,2-diyl-bis(1,3-propanediamine), cyclohexane, peroxidized 4-butylamino-2,2,6,6-tetramethylpiperidine and 2,4,6-trichloro-1,3,5-triazine, commercially available as Flamestab NOR 116 (from BASF); and Hostavin NOW ex (from Clariant).

The blend may further comprise at least one flame retardant. These are needed, in particular, in case the composition is used in roofing applications, for example, for providing a roofing membrane containing one or more layers composed of the composition of the present invention.

According to one or more embodiments, the blend further comprises 1-50% by weight, preferably 5-40% by weight, based on the total weight of blend, of at least one flame retardant selected from the group consisting of magnesium hydroxide, aluminum trihydroxide, antimony trioxide, ammonium polyphosphate, and melamine-, melamine resin-, melamine derivative-, melamine-formaldehyde-, silane-, siloxane-, and polystyrene-coated ammonium polyphosphates.

Other suitable flame retardants include, for example, 1,3,5-triazine compounds, such as melamine, melam, melem, melon, ammeline, ammelide, 2-ureidomelamine, acetoguanamine, benzoguanamine, diaminophenyltriazine, melamine salts and adducts, melamine cyanurate, melamine borate, melamine orthophosphate, melamine pyrophosphate, dimelamine pyrophosphate and melamine polyphosphate, oligomeric and polymeric 1,3,5-triazine compounds and polyphosphates of 1,3,5-triazine compounds, guanine, piperazine phosphate, piperazine polyphosphate, ethylene diamine phosphate, pentaerythritol, borophosphate, 1,3,5-trihydroxyethylisocyanaurate, 1,3,5-triglycidylisocyanaurate, triallylisocyanurate and derivatives of the aforementioned compounds.

Suitable flame retardants are commercially available, for example, under the trade name of Martinal® and Magnifin® (both from Albemarle) and under the trade names of Exolit® (from Clariant), Phos-Check® (from Phos-Check) and FR CROS® (from Budenheim).

The blend may further comprise at least one UV-absorber selected the group consisting of hydroxybenzophenones, hydroxybenzotriazoles, triazines, anilides, benzoates, cyanoacrylates, phenylformamidines, and mixtures thereof.

According to one or more embodiments, the blend further comprises 0.1-10.0 by weight, preferably 0.5-5.0% by weight, based on the total weight of the blend, of at least one UV-absorber. Suitable UV-absorbers are commercially available, for example, under the trade name of Tinuvin® (from Ciba Specialty Chemicals), such as Tinuvin® 213, 234, 320, 326-329, 350, 360, 571.

The blend may further comprise other additives such as fillers, thermal stabilizers, plasticizers, foaming agents, dyes, colorants, pigments, matting agents, antistatic agents, impact modifiers, and processing aids such as lubricants, slip agents, antiblock agents, and denest aids. Suitable fillers include, for example, inert mineral fillers, such as sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

According to one or more embodiments, the composition comprises at least 50 wt.-%, preferably at least 75 wt.-%, more preferably at least 85 wt.-%, most preferably at least 95 wt.-% of the melt blend, based on the total weight of the composition. According to one or more further embodiments, the composition is composed of the melt blend.

One of the advantages of the composition of the present invention is that it shows low blocking behavior, which enables unproblematic post-processing of the composition, such as cutting, welding, stacking, and unwinding from a roll of shaped articles such as films or membranes prepared from the composition. In particular, the composition may exhibit a blocking value, determined by means of the method cited in the description, of not more than 5 N/15 mm, preferably not more than 2.5 N/15 mm, most preferably not more than 1.5 N/15 mm.

In the context of the present invention, the "blocking value" of a composition refers to the peeling force, which is required to separate two layers of the composition from each other and which is determined by using the measurement method as described below.

Measurement of the Blocking Value

The blocking value of a composition is determined based on the measurement method as defined in DIN 53366 standard. The measurement is conducted at a temperature of 23° C. using a peeling mode instead of a shearing mode, i.e. the sheets of the composition are separated from each other by using a peeling force. The blocking value is determined as force in N/15 mm width of sheet required to separate the two sheets from each other after the sheets have been pressed together for a period of 72 hours at a temperature of 50° C. using a pressure of 0.5 kg/cm2.

Another advantage of the composition of the present invention is that it has a high flexibility, in particular compared to State-of-the-Art TPO-materials. In particular, the composition may have an elastic modulus, measured by using the method as defined in ISO 527-2 standard at a temperature of 23° C. using a cross head speed of 5 mm/min, of not more than 50 N/mm$^2$, preferably not more than 25 N/mm$^2$, most preferably not more than 15 N/mm$^2$.

A further advantage of the composition of the present invention is that is has a high resistance to impact. In particular, the composition may have a resistance to impact, measured using the method as defined in EN 12691 type A standard, of at least 1,000 mm, preferably at least 1,250 mm, and/or a resistance to impact, measured according to the method as defined in EN 12691 type B standard, of at least 1,750 mm, preferably at least 2,000 mm. The resistance to impact is measured using a layer composed of the composition of the present invention and having a thickness of 0.8 mm.

The composition may have a tensile strength at break, measured using the method as defined in ISO 527-2 standard at a temperature of 23° C. using a cross head speed of 100 mm/min, of at least 7.5 N/mm$^2$, preferably at least 10 N/mm$^2$.

The composition may have an elongation at break, measured by using the method as defined in ISO 527-2 standard at a temperature of 23° C. using a cross head speed of 100 mm/min, of at least 500%, preferably of at least 600%, most preferably at least 650%.

Another subject of the present invention is a method for producing a polymer composition, the method comprising steps of:
I) Introducing the blend components of the composition of the present invention into a mixing apparatus and
II) Melt processing the blend components in the mixing apparatus at a temperature above the melting point of the at least one thermoplastic elastomer.

In case the blend components comprise more than one thermoplastic elastomer, the melt processing is preferably conducted at a temperature, which is above the melting point of the thermoplastic elastomer having the highest melting point.

The mixing apparatus may be a batch mixer, preferably a Brabender, Banbury or a roll mixer. The maximum temperature of the blend during melt processing in the batch mixer is preferably not less than 150° C., more preferably not less than 160° C., most preferably not less than 180° C. The maximum temperature of the blend during melt processing can be in the range of 150-250° C., in particular 160-220° C., such as 180-200° C.

In embodiments wherein the blend components comprise at least one catalyst, the temperature of the blend is preferably increased during mixing until the chain extension and/or crosslinking/and/or coupling reactions of the at least one non-crosslinked elastomer are initiated. This is typically marked by an increase in the torque value of the motor of the mixing apparatus. The melt-mixing may be continued until the torque value of the motor of the mixing apparatus reaches a value, which is, for example, 1-20%, preferably 1-15%, above the lowest value measured at the beginning of the melt-mixing, i.e. before the initiation of the chain extension and/or crosslinking/and/or coupling reactions, after which the mixing is discontinued. The thus obtained mixture can be allowed to cool to room temperature.

The catalyst and the accelerator, if used, may be dispersed in the non-crosslinked elastomer in a separate process step prior to the melt mixing with the thermoplastic elastomer(s). Dispersing the catalyst and the optional accelerator in the non-crosslinked elastomer may be conducted using any conventional mixing apparatus such as a two-roll rubber mill, Bradender, or Banbury mixer, or a continuous type melt mixed such as a single- or twin-screw extruder. In any case, the catalyst, the optional accelerator, and the at least one non-crosslinked elastomer are thoroughly melt mixed with the thermoplastic elastomer prior to the initiation of the chain extension and/or crosslinking/and/or coupling reactions.

The mixing apparatus is preferably a continuous type mixer, more preferably an extrusion apparatus comprising an extruder, such as a single screw or a twin screw extruder, and an extruder die. The constituents of the blend are preferably melt processed in the extruder until a uniform blend is obtained. According to one or more embodiments, the mixing apparatus is a continuous type extrusion apparatus comprising an extruder and a die and the method comprises a further step iii) of extruding the melt processed mixture obtained in step ii) through the extruder die.

A suitable extruder comprises a barrel and a screw unit contained in the barrel or a ram. Any conventional extruders, for example, a ram extruder, single screw extruder, or a twin-screw extruder may be used. Preferably, the extruder is a screw extruder, more preferably a twin-screw extruder. The screw unit of a conventional screw extruder is typically considered to comprise feed, transition, and metering sections. In the feed section the thermoplastic composition enters the channels of the rotating screw and is conveyed towards the transition section, in which the composition is compressed and melted. The composition should be fully melted when it leaves the transition section. The function of the metering section is to homogenize the melted composition and to allow it to be metered or pumped out at constant rate. The extruder apparatus further comprises a die, preferably a flat die, consisting of manifold, approach, and lip regions.

The extruder barrel comprises a feed port through which the material to be extruded is fed to the extruder and an outlet port through which the material leaves the barrel. The outlet port is coupled with the die via a gate or adapter piece. A mixing device may be interposed between the barrel and the die. The feed port is generally connected with a hopper to which the material to be extruded is added. It is preferred that a screen pack and a breaker plate are positioned at the end of the barrel to avoid plugging in the nozzles. The extruder further comprises heating elements, cooling elements, temperature sensors and temperature control elements to provide temperature controlled zones along the barrel, also known as barrel zones. The extruder may comprise, for example, 3 to 8 barrel zones, preferably at least 5 barrel zones, by the use of which a temperature profile can be realized in the barrel.

The extrusion process may be conducted by using different temperature profiles, such as an increasing temperature profile where the temperature increases downstream the barrel, a decreasing temperature profile where the temperature decreases downstream the barrel, and a humped temperature profile where the temperature increases from the feed port toward a certain set point, for example toward the middle of the barrel.

It may be preferable that the dimensions of the extruder and the extrusion process parameters, in particular the temperature profile and the extrusion pressure, are chosen/adjusted such that in the melt processed mixture obtained in step ii), the crosslinking degree of the at least one elastomer is not more than 10.0 wt.-%, more preferably not more than 5.0 wt.-%, even more preferably not more than 2.5 wt.-%, most preferably not more than 2.0 wt.-%. In another words, it may be preferable that the dimensions of the extruder and the extrusion process parameters are chosen/adjusted such that the at least one non-crosslinked elastomer is crosslinked in the extruder screw section to a crosslinking degree of not more than 10.0 wt.-%, more preferably not more than 5.0 wt.-%, even more preferably not more than 2.5 wt.-%, most preferably not more than 2.0 wt.-%.

The maximum temperature of the blend during melt processing in the screw section of the extruder, i.e. the temperature in at the end of the screw section, is preferably not less than 150° C., more preferably not less than 160° C., most preferably not less than 180° C. The maximum temperature of the blend during melt processing in the screw section of the extruder can be in the range of 150-250° C., in particular 160-220° C., such as 180-200° C.

The at least one thermoplastic elastomer, the at least one non-crosslinked elastomer, and the catalyst, if used, may be fed to the extruder as individual streams, as a pre-mix, dry blend, or as a master batch.

The at least one thermoplastic elastomer and the at least one non-crosslinked elastomer may be fed into the extruder through the feed port and the at least one catalyst, if used, may fed into the extruder through another port located downstream from the feed port. The term "downstream" designates in the present document the direction to the outlet port. The at least one non-crosslinked elastomer can also be mixed with the at least one catalyst, if used, to obtain a premix, which is then fed into the extruder through the feed port. The premixing can be carried out using a blending apparatus, which are known to a person skilled in the art. Preferably the premixing of the at least one non-crosslinked elastomer and catalyst is conducted at a temperature, which is above the melting point of the non-crosslinked elastomer and below the activation temperature of the catalyst, i.e. temperature at which the chain extension and/or crosslinking/and/or coupling reactions of the non-crosslinked elastomer are initiated. Alternatively, the at least thermoplastic elastomer and the at least one non-crosslinked elastomer can be processed in a compounding extruder to pellets or granules, which are dry-blended with the at least one catalyst, if used, and the resulting dry-blend is then fed into extruder though the feed port.

The at least one aminealkoxy (NOR) hindered amine light stabilizer (HALS) as well as other additives, such as UV- and thermal stabilizers, if used, may be fed into to extruder through the feed port or through another port located downstream of the feed port. It may be also be preferable that these additives are fed into the extruder as dry-blended with the at least one catalyst.

Another subject of the present invention is a polymer composition obtainable by using the method for producing a polymer composition of the present invention Another subject of the present invention is a shaped article comprising a substrate layer having a thickness of at least 0.1 mm, said substrate layer being composed of the composition of the present invention or of the polymer composition of the present invention. Preferably, the substrate layer has a thickness, measured according to the method as defined in DIN EN 1849-2 standard, of 0.1-5.0 mm, more preferably 0.25-4.0 mm, most preferably 0.3-3.0 mm. An optical microscope, such as of type Keyence VHX-600 with 30-fold magnification, can be used for measuring the thicknesses of the layer cross sections.

One of the advantages of the shaped article of the present invention is that is has low blocking behavior, which enables unproblematic post-processing of the shaped article, such as cutting, welding, stacking, and unwinding from a roll. In particular, the shaped article may exhibit a blocking value, determined by means of the method cited in the description, of not more than 5 N/15 mm, preferably not more than 2.5 N/15 mm, most preferably not more than 1.5 N/15 mm.

Another advantage of the shaped article of the present invention is that it has a high flexibility, in particular compared to State-of-the-Art waterproofing and roofing membranes composed of TPO-materials. In particular, the shaped article may have an elastic modulus, measured by using the method as defined in ISO 527-2 standard at a temperature of 23° C. using a cross head speed of 5 mm/min, of not more than 50 N/mm$^2$, preferably not more than 25 N/mm$^2$, most preferably not more than 15 N/mm$^2$.

A further advantage of the shaped article of the present invention is that is has a high resistance to impact. In particular, the shaped article may have a resistance to impact, measured using the method as defined in EN 12691 type A standard, of at least 1,000 mm, preferably at least 1,250 mm, and/or a resistance to impact, measured according to the method as defined in EN 12691 type B standard, of at least 1,750 mm, preferably at least 2,000 mm. The resistance to impact is measured with a shaped article consisting of a substrate layer having a thickness of 0.8 mm.

The shaped article may have a tensile strength at break, measured using the method as defined in ISO 527-2 standard at a temperature of 23° C. using a cross head speed of 100 mm/min, of at least 7.5 N/mm$^2$, preferably at least 10 N/mm$^2$.

The shaped article may have an elongation at break, measured by using the method as defined in ISO 527-2 standard at a temperature of 23° C. using a cross head speed of 100 mm/min, of at least 500%, preferably of at least 600%, most preferably at least 650%.

The shaped article may further comprise a reinforcing scrim layer embedded into the substrate layer or a reinforcing fiber layer bonded directly to one of its surfaces. A suitable reinforcing scrim layer may comprise a mesh of interwoven strands of thermoplastic or metal having a tensile strength sufficient to resist tearing when exposed to typical tensile loads experienced by roofing membranes from various directions. Preferred materials for the reinforcing scrim layer include polypropylene and polyethylene terephthalate (PET). The reinforcing fiber layer can be in the form of a fiber mat, a fiber-woven fabric or a fibrous tissue. Particularly suitable materials for the reinforcing fiber layer include inorganic fibers, such as glass fibers, aramid fibers, wollastonite fibers, and carbon fibers and synthetic organic fibers, such as polyester fibers, ethylene and propylene homopolymer fibers, ethylene propylene copolymer fibers, viscose fibers, polyamide fibers, and nylon fibers.

Another subject of the present invention is a method for producing a shaped article, the method comprising steps of:
I) Introducing the blend components of the composition of the present invention into a continuous type extrusion apparatus comprising an extruder and a flat die,
II) Melt processing the blend components in the extruder to obtain a melt processed mixture of the blend components, and
III) Extruding the obtained melt processed mixture through the flat die to form a substrate layer.

The extruder used in the method can be any conventional type extruder, such as single- or double screw extruder.

Preferably, the method for producing a shaped article comprises a further step of:
IV) Employing spaced apart calender cooling rolls through which the formed substrate layer is drawn immediately following step III).

Still another subject of the present invention is method for covering a roof, the method comprising steps of:
I) Applying shaped articles of the present invention on surface of the roof to be covered,
II) Overlapping the adjacent edges of the shaped articles,
III) Heating the adjacent edges of the shaped articles in the overlapping areas slightly above the melting temperature of the at least one thermoplastic elastomer, and seaming the overlapped areas under sufficient pressure to provide acceptable seam strength without use of adhesive.

EXAMPLES

The materials shown in Table 1 were used in the examples.

TABLE 1

Materials used in the experiments

| Material | Composition | Provider |
| --- | --- | --- |
| Hifax CA 10 | Reactor TPO | LyondellBasell |
| Vistamaxx 6202 | Propylene ethylene copolymer | Exxon Mobil |
| BB2030 | Bromobutyl rubber | Lanxess |
| RB100 | Butyl rubber | Lanxess |
| RB301 | Butyl rubber | Lanxess |
| SiloxActif E80 | Zinc oxide catalyst | Safic Alcan |
| Stearic acid | Stearic acid | Emery Oleochemicals |
| Thermal stabilizer | Thermal stabilizer | Ciba Specialty Chemicals |
| NOR-HALS 1 | Alkoxyamine hindered amine light stabilizer | Ciba Specialty Chemicals |
| NOR-HALS 2 | Alkoxyamine hindered amine light stabilizer | Ciba Specialty Chemicals |
| Alumina trihydrate | Al(OH)$_3$ | Albemarle |
| Titanium dioxide | TiO$_2$ | Kronos |

TABLE 1-continued

Materials used in the experiments

| Material | Composition | Provider |
| --- | --- | --- |
| Santoprene 101-87 | Dynamically vulcanized alloy of polypropylene and EPDM | Exxon Mobil |
| Milastomer 6032 NE | Olefin-based thermoplastic vulcanizate (TPV) | Mitsui Chemicals |

Preparation of Example Sheets

The example sheets were produced using a laboratory scale extrusion-calendering apparatus consisting of a twin screw extruder (Berstorff GmbH), a flat die and set of water-cooled calender rolls. Extrusion temperatures and pressures are presented in Table 2.

In producing of the example sheets, the thermoplastic elastomer and the non-crosslinked elastomer were fed to the extruder hopper. The blend was melt-processed in the first of the four zones of the extruder and an additive package containing a mixture of a catalyst, hindered amine light stabilizers (NOR-HALS), and flame retardants was added to the partially melt-processed blend at beginning of the second zone of the extruder. The melt-processed blend was then extruded through the flat die into single ply sheets having a thickness of approximately 0.8 mm.

Test specimens were cut from the example sheets to test the mechanical properties of the compositions. The ingredients of the blends and measured properties of the example sheets are shown in Tables 2 and 3.

Tensile Strength, Elongation at Break, and E-Modulus

The tensile strength at 100%, 300%, and at break, the elongation at break, and E-Modulus were measured according to ISO 527-2 standard at a temperature of 23° C. using a cross head speed of 100 mm/min for tensile strengths and elongation at break and 5 mm/min for E-Modulus. The values presented in Table 3 have been obtained with test specimens, which were cut from the example sheets in lengthwise direction.

Blocking Behavior

The blocking value of example compositions was determined based on the measurement method as defined in to DIN 53366 standard at a temperature of 23° C. The measurement was conducted using a peeling mode instead of a shearing mode, i.e. the sheets were separated from each other by peeling. The blocking value was determined as force in N/15 mm width of sheet required to separate the two sheets of the tested composition from each other after the sheets had been pressed together for a period of 72 hours at a temperature of 50° C. using a pressure of 0.5 kg/cm$^2$. The blocking values were measured using the same apparatus as used for measuring the tensile strengths.

Resistance to Impact

The resistance to impact was measured by using the method as defined in EN 12691 type A standard and in EN 12691 type B standard.

Molecular Weight

The number average ($M_n$) and weight average ($M_w$) molecular weights and polydispersity index (PDI) were determined by means of HT-GPC (Gel Permeation Chromatography) measurements conducted under following conditions:

System: Agilent 1100
Concentration detector: Refractive index detector
Precolumn: PSS Polyolefin lin xl (0.8 cm×5 cm, 10 μm)
Columns: 4×PSS Polyolefin lin xl (0.8 cm×30 cm, 10 μm)
Eluent: 1,2,4-Trichlorbenzole Flow: 1 mL/min
Injection volume: 200 μL
Temperature: 160° C.
Calibration: Relative to polystyrene
Standards: Polystyrene: 266-3,080,000 g/mol
Sample preparation: 27 mg of each sample was dissolved in 9 ml of 1,2,4-Trichlorbenzole at 160° C. for 2 hours.

Weldability

Weldability of the example sheets was tested using a welding temperature of 240° C. and a welding speed of 3.5 m/min. A Sarnamatic 661 welding automat was used in welding the sheets. The weldability was considered as satisfactory (=OK) when in a tear testing, a break occurred outside of the welding seam between the joined sheets.

TABLE 2

|  | Ex-1 | Ex-2 | Ex-3 | Ex-4 | Ex-5 | Ex-6 | [a]Ref-1 |
|---|---|---|---|---|---|---|---|
| Composition [phr] | | | | | | | |
| Hifax CA 10 | 20 | 20 | 20 | 20 | 20 | 20 | 20 |
| Vistamaxx 6202 | 49 | 49 | 49 | 49 | 49 | 49 | 49 |
| BB2030 | 31 | 31 | 31 | 31 | — | — | 31 |
| RB100 | — | — | — | — | 31 | — | — |
| RB301 | — | — | — | — | — | 31 | — |
| SiloxActif E80 | — | 1.38 | 1.38 | 1.38 | 1.38 | 1.38 | 1.38 |
| Stearic acid | 0.35 | 0.35 | 0.35 | 0.35 | 0.35 | 0.35 | 0.35 |
| Thermal stabilizer | 0.1 | 0.1 | 0.1 | 0.1 | 0.1 | 0.1 | 0.1 |
| NOR-HALS 1 | 0.45 | 0.45 | 0.45 | 0.45 | 0.45 | 0.45 | 0.45 |
| NOR-HALS 2 | 0.3 | 0.3 | 0.3 | 0.3 | 0.3 | 0.3 | 0.3 |
| Alumina trihydrate | 42 | 42 | 42 | 42 | 42 | 42 | 42 |
| Titanium dioxide | 3 | 3 | 3 | 3 | 3 | 3 | 3 |
| Extruder conditions | | | | | | | |
| Extrusion temperature [° C.] | 185 | 185 | 195 | 205 | 185 | 185 | 185 |
| Head pressure [bar] | 69 | 70 | 71 | 69 | 72 | 81 | 70 |

[a]Extruded sheet of Ex-2 was cured in an oven under nitrogen atmosphere at a temperature of 190° C.

TABLE 3

|  | Ex-1 | Ex-2 | Ex-3 | Ex-4 | Ex-5 | Ex-6 | [a]Ref-1 | [b]Ref-2 | [c]Ref-3 |
|---|---|---|---|---|---|---|---|---|---|
| Mechanical properties | | | | | | | | | |
| Tensile strength at 100% [N/mm²] | 2.25 | 2.74 | 2.8 | 2.84 | 2.58 | 2.48 | 1.94 | 6.62 | 1.72 |
| Tensile strength at 300% [N/mm²] | 3.65 | 3.5 | 3.5 | 3.4 | 4.45 | 4.16 | 2.56 | 8.75 | 3.3 |
| Tensile strength at break [N/mm²] | 11.3 | 12.7 | 11.2 | 11 | 11.12 | 11.21 | 6.96 | 14.48 | 4.72 |
| Elongation at break [%] | 710 | 815 | 828 | 819 | 650 | 670 | 930 | 524 | 441 |
| E-Modulus [N/mm²] | 8.8 | 14.5 | 14.3 | 14.3 | 8.96 | 9.65 | 10.3 | 59.4 | 4.1 |
| Resistance to impact method A [mm] | 1100 | 550 | 450 | 400 | 1000 | 900 | — | 1100 | 200 |
| Resistance to impact method B [mm] | 2300 | 2300 | 2300 | 2300 | 2300 | 2300 | — | 1250 | 2300 |
| Blocking force [N/15 mm] | 12 +/− 4 | 0.6 +/− 0.3 | — | — | 10 +/− 2 | 4 +/− 2 | — | 0 | 0.2 |
| Molecular weight | | | | | | | | | |
| $M_n$ [g/mol] | 114 | 120 | 114 | 108 | 124 | 129 | — | — | — |
| $M_w$ [g/mol] | 323 | 420 | 389 | 387 | 346 | 408 | — | — | — |
| PDI | 2.82 | 3.51 | 3.41 | 3.58 | 2.79 | 3.16 | — | — | — |
| Weldability at 240° C., 3.5 m/min | OK | OK | OK | OK | OK | OK | Not OK | OK | OK |

[a]Extruded sheet of Ex-2 was cured in an oven under nitrogen atmosphere at a temperature of 190° C.
[b]Santoprene 101-87, thermoplastic vulcanizate (TPV), from Exxon Mobil
[c]Milastomer 6032 NE, olefin-based thermoplastic vulcanizate TPV from Mitsui Chemicals

The invention claimed is:

1. A composition comprising a melt blend of:
  a) 15-95 wt.-% of at least one thermoplastic elastomer,
  b) 5-50 wt.-% of at least one non-crosslinked elastomer, and
  c) 0.1-5.0 wt.-%, based on the total weight of the blend, of at least one catalyst,
  said proportions being based on the total weight of the blend,
  wherein the melt blend is obtained by melt processing of said blend components, and
  wherein the at least one non-crosslinked elastomer is crosslinked during the melt processing to a crosslinking degree, measured by using the method as defined in ISO 10147 standard, of not more than 10.0 wt.-%.

2. The composition according to claim 1, wherein the at least one catalyst is selected from the group consisting of ZnO, CaO, MgO, $Al_2O_3$, $CrO_3$, FeO, $Fe_2O_3$, NiO, zinc salts of fatty acids having at least 6 carbon atoms, and zinc borate.

3. The composition according to claim 1, wherein the blend further comprises at least one metal salt of a fatty acid different from the at least one catalyst and/or one or more fatty acids.

4. The composition according to claim 1, wherein the at least one catalyst is ZnO, zinc salt of a fatty acid having at least 6 carbon atoms, or zinc borate or a mixture of ZnO and at least one other metal oxide selected from the group consisting of CaO, MgO, $Al_2O_3$, $CrO_3$, FeO, $Fe_2O_3$, and NiO.

5. The composition according to claim 1, wherein the at least one non-crosslinked elastomer, before melt processing, has a mole percent unsaturation of not more than 5.0.

6. The composition according to claim 1, wherein the at least one non-crosslinked elastomer is selected from the group consisting of butyl rubber and halogenated butyl rubber and/or the at least one thermoplastic elastomer is a thermoplastic polyolefin elastomer (TPE-O).

7. The composition according to claim 1, wherein in the composition, the thermoplastic elastomer and the elastomer form a co-continuous phase.

8. The composition according to claim 1, wherein the blend further comprises 0.1-10.0% by weight, based on the total weight of the blend, of at least one alkoxyamine hindered amine light stabilizer (NOR-HALS).

9. The composition according to claim 1 comprising at least 75 wt.-% of the melt blend, based on the total weight of the composition.

10. The composition according to claim 1 having a blocking value of not more than 5.0 N/15 mm.

11. The composition according to claim 1 having at least one of the following:
an elastic modulus, measured by using the method as defined in ISO 527-2 standard at a temperature of 23° C., of not more than 50 N/mm$^2$,
a tensile strength at break, measured by using the method as defined in ISO 527-2 standard, of at least 5 N/mm$^2$, and
an elongation at break, measured by using the method defined in ISO 527-2 standard, of at least 500%.

12. The composition according to claim 1 having at least one of the following:
a resistance to impact measured by using the method as defined in EN 12691 type A standard, of at least 1,000 mm, and
a resistance to impact measured by using the method as defined in EN 12691 type B standard, of at least 1,750 mm,
wherein both resistances are measured using a layer composed of the composition and having a thickness of 0.8 mm.

13. A method for producing a polymer composition, the method comprising steps of:
i) introducing the blend components as defined in claim 1 into a mixing apparatus,
ii) melt processing the blend components in the mixing apparatus at a temperature that is above the melting point of the at least one thermoplastic elastomer.

14. The method according to claim 13, wherein the mixing apparatus is a continuous type extrusion apparatus comprising an extruder and a die and the method comprises a further step iii) of extruding the melt processed mixture obtained in step ii) through the die.

15. A polymer composition obtained by using the method according to claim 13.

16. A shaped article comprising a substrate layer having a thickness of at least 0.1 mm, said substrate layer being composed of a composition comprising a melt blend of:
a) 15-95 wt.-% of at least one thermoplastic elastomer,
b) 5-50 wt.-% of at least one non-crosslinked elastomer, said proportions being based on the total weight of the blend, wherein the melt blend is obtained by melt processing of said blend components, or of the polymer composition according to claim 15.

17. A method for producing a shaped article comprising steps of:
i) introducing the blend components as defined in claim 1 to a continuous type extrusion apparatus comprising an extruder and a flat die,
ii) melt processing the blend components in the extruder to obtain a melt processed mixture of the blend components, and
iii) extruding the melt processed mixture through the flat die to form a substrate layer, and optionally
iv) employing spaced apart calender cooling rolls through which the formed substrate layer is drawn immediately following step iii).

18. A method for covering a roof comprising steps of:
i) applying shaped articles according to claim 16 on a surface of the roof to be covered,
ii) overlapping the adjacent adjacent edges of said articles,
iii) heating the adjacent edges of the articles in the overlapping areas slightly above the melting temperature of the thermoplastic elastomer and seaming the overlapped areas under sufficient pressure to provide seam strength without use of adhesive.

19. The composition according to claim 1, wherein the at least one catalyst comprises ZnO, and wherein the at least one non-crosslinked elastomer is crosslinked during the melt processing to a crosslinking degree, measured by using the method as defined in ISO 10147 standard, of not more than 2.0 wt.-%.

20. A composition comprising a melt blend of:
a) 15-95 wt.-% of at least one thermoplastic elastomer,
b) 5-50 wt.-% of at least one non-crosslinked elastomer, and
c) 0.1-5.0 wt.-%, based on the total weight of the blend, of at least one catalyst selected from the group consisting of ZnO, CaO, MgO, Al$_2$O$_3$, CrO$_3$, FeO, Fe$_2$O$_3$, NiO, zinc salts of fatty acids having at least 6 carbon atoms, and zinc borate,
said proportions being based on the total weight of the blend,
wherein the melt blend is obtained by melt processing of said blend components.

* * * * *